United States Patent [19]
Miler et al.

[11] Patent Number: 5,181,036
[45] Date of Patent: Jan. 19, 1993

[54] FALSE RETURN SIGNAL APPARATUS

[75] Inventors: Robert L. Miler, Bowie; Irwin J. Abramovitz, Baltimore, both of Md.

[73] Assignee: Westinghouse Electric Corp., Pittsburgh, Pa.

[21] Appl. No.: 819,901

[22] Filed: Jan. 13, 1992

[51] Int. Cl.$^5$ .............................................. G01S 7/38
[52] U.S. Cl. ........................................ 342/15; 342/172
[58] Field of Search ......................... 342/15, 52, 172; 310/313 R

[56] References Cited

U.S. PATENT DOCUMENTS 4,876,546 10/1989 Koerner .................................. 342/15
4,903,029 2/1990 Newberg et al. .................... 342/172
4,980,596 12/1990 Sacks et al. ....................... 310/313 D

OTHER PUBLICATIONS

R. L. Miller et al. *Direct Optical Signal Injection In An ACT Channel*, Ultrasonics Symposium Proceedings, IEEE, 1987, p. 15, Cat #87-CH-2492-7, Rolling Meadows, Ill 60008.

*Interaction Between Light and Sound*, IEEE Spectrum, May 1967, pp. 42–54.

Primary Examiner—Gilberto Barron, Jr.
Attorney, Agent, or Firm—W. G. Sutcliff

[57] ABSTRACT

An optical acoustic charge transport (ACT) device provides a variable and continuous delay for RF signals. Received RF signals are converted to light and focused onto an optical ACT device. The continous delay is utilized to generate a false radar return.

8 Claims, 4 Drawing Sheets

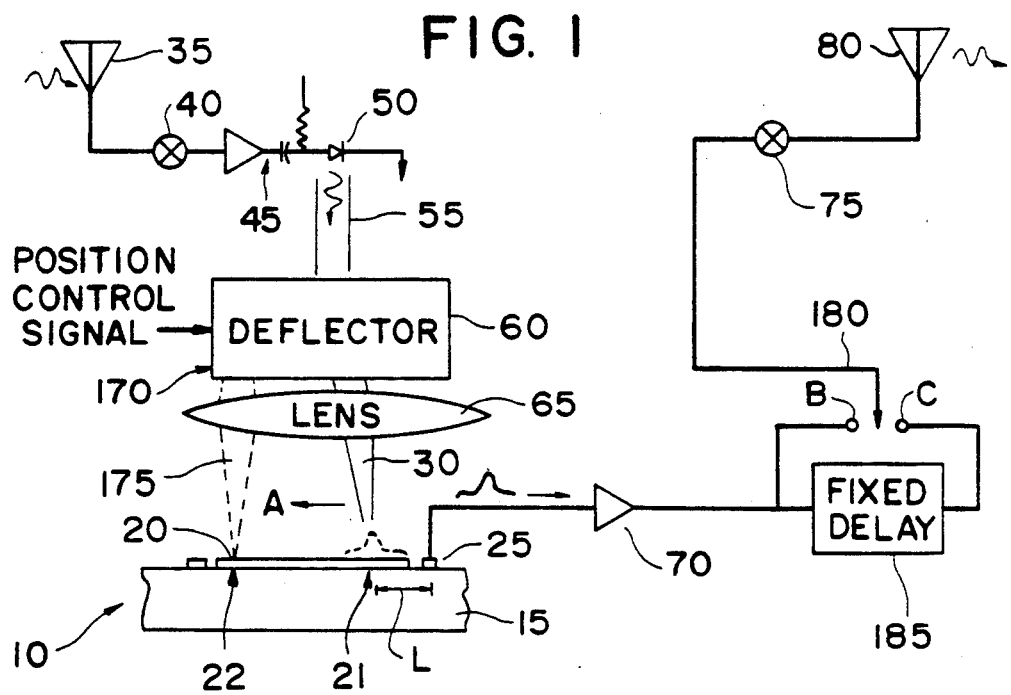

FALSE RETURN SIGNAL APPARATUS

BACKGROUND OF THE INVENTION

This invention relates to signal processing; and more particularly, to generating false radar return signals. When radar is employed in an electronic counter measure (ECM) system, it is desirable to transmit false radar return signals. By delaying these signals in time, the target can appear to an unfriendly radar system, to be at a location other than its actual location. This technique is known as Range Gate Pull-Off (RGPO), and utilizes the automatic range tracking teacher of an unfriendly radar system. Conventionally, in RGPO systems, the unfriendly radar signal is captured, delayed and retransmitted. The delay is increased, which affectively walks the unfriendly radar off the appropriate range. Typically, the false radar return signal is then turned off leaving the unfriendly radar range gate with no signal; thus, affectively breaking the unfriendly radar's range tracking. Typically, this causes the unfriendly radar to revert to a reacquisition mode and to begin a range search.

There are currently several approaches to false radar return signal generation. For example, a first approach, snapshots of a received radar signals are frozen (i.e., briefly stored) and then retransmitted after a delay. With this approach, there is a limit on the signal length that can be captured and retransmitted. The limit depends upon the length of the device that captures the signal. For example, in an acoustic charge transport (ACT) device, the device channel length limits the signal length that can be captured. Currently, ACT devices can capture, at best, approximately $10\mu s$ of a signal; and can hold the signal for approximately 20 $\mu sec$.

Another ACT device approach is an ACT tapped delay line device. In this device, a set of electrodes (taps) are positioned at various points along the ACT channel. Switching between the various taps provides a variable delay. However, there is a discrete change between the different delays. This discrete change could be detected and used to disregard the delayed or false radar return.

Presently, a digital radio-frequency memory (DRFM) is commonly used to provide delayed signals in radar systems that generate false returns using the delayed signals. Such DRFM systems, however, require hundreds of watts of power. The systems also used A/D and D/A converters which, by their very nature, introduce distortion in the system that causes unwanted sidebands in a delayed/false return signal.

SUMMARY OF THE INVENTION

It is an object of the present invention to provide a low power false return signal apparatus having a simple and light weight structure.

It is another object of the present invention to provide a false return signal apparatus that can generate a continuously variable delay in a false radar return signal.

It is a further object of the present invention to provide a false return signal apparatus with no limit on the signal length that can be delayed and returned.

It is still another object of the present invention to provide a false return signal apparatus that eliminates or minimizes unwanted sidebands in the returned signal.

It is still another object of the present invention to provide a false return signal apparatus capable of providing multiple false return signals.

To achieve the above and other objects, the present invention provides a false return signal apparatus including a receiver means for receiving radar signals and for generating light responsive to the received radar signals; a detector means for variably deflecting the light across a predetermined area; and an acoustic charge transport (ACT) device positioned in the predetermined area and having an output connected to provide a return signal responsive to the light received from the deflector means.

BRIEF DESCRIPTION OF THE FIGURES

FIG. 1 is a block diagram of a system embodying the present invention;

FIG. 2 schematically illustrates the optics of the FIG. 1 system;

FIG. 3 schematically illustrates an example of a circuit for providing the position control signal in the FIG. 1 system;

DESCRIPTION OF THE PREFERRED EMBODIMENTS

I General System

Figure 4:
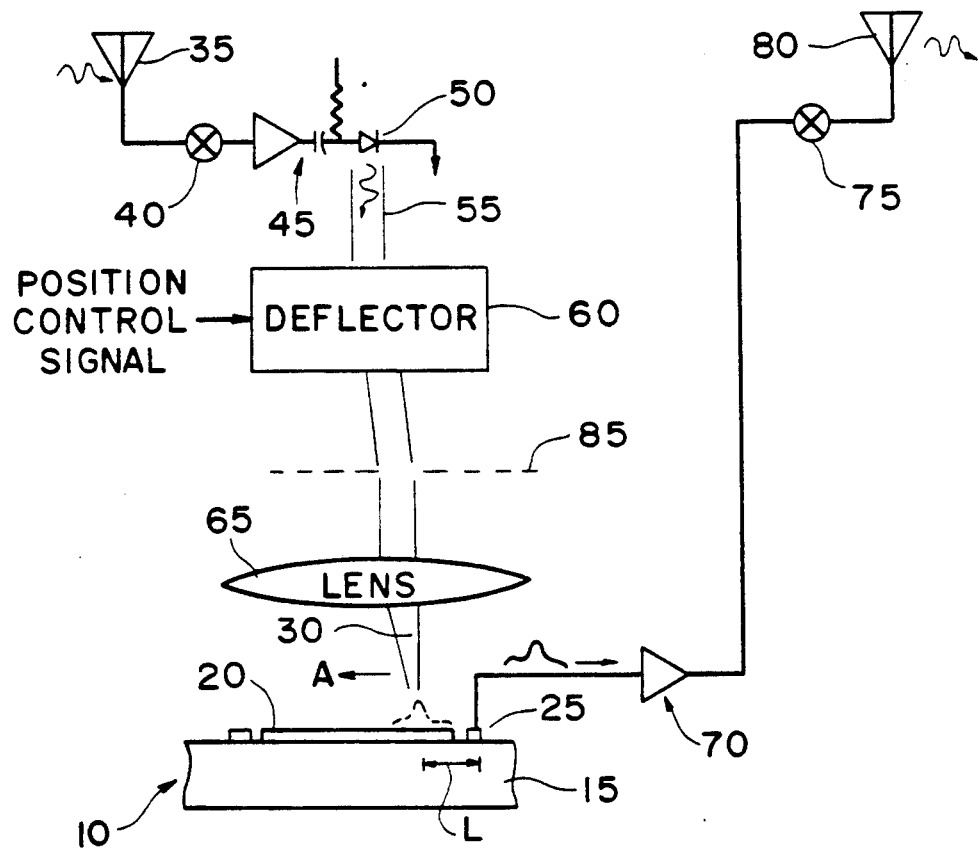
FIG. 4 is a second embodiment of the present invention.

FIG. 1 is a block diagram of a system embodying the present invention. In FIG. 1, reference numeral 10 identifies an optical acoustic charge transport (ACT) device. This device comprises, for example, an n-type channel layer 15 and a light sensitive channel plate 20. The light sensitive channel plate 20 can comprise, for example, a P+ doped GaAs layer. Reference numeral 25 in FIG. 1 identifies an output terminal of the optic ACT device. The operation and structure of an optical ACT structure is well known and is described in, for example, Miller et al., "Direct Optical Signal Injection In An ACT Channel," IEEE Ultrasonics Symposium Proceedings, IEEE, Cat. No. 87 - CH 2492-7, 1987. Briefly, the P+/n junction comprising the channel plate 20 and n layer 15 is reverse biased. When a light beam 30 illuminates the channel plate 20, electron-hole pairs are generated in the layer 15. As is known, a surface acoustic wave travels in the layer 15. This surface acoustic wave groups the generated electrons and carries them towards the output terminal 25. The length L determines the amount of delay between the time that the light beam 30 illuminates the channel plate 20 and the grouped electrons reach the output terminal 25. More particularly, the time is expressed by $T = L/v$, where v is the speed of the acoustic wave travelling in the layer 15.

In the FIG. 1 system, an antenna 35 receives an r.f. signal which is translated down to an intermediate frequency by way of a local oscillator 40. The intermediate frequency signal passes through a biasing circuit 45 that biases a laser diode 50. The intermediate frequency signal amplitude modulates the laser diode 50 to generate an amplitude modulated optical beam 55. As shown in FIG. 1, the optical beam 55 passes through a deflector 60. The output of the deflector 60 passes through a lens 65 to form the light beam 30.

The deflector 60 moves the light beam 30 across a predetermined area on the channel plate 20 in accordance with a position control signal. As the light beam 30 moves in a direction of the arrow A, the amount of delay is increased; and a Doppler shift is automatically created in the signal provided at the output terminal 25. In general, the amount of doppler shift is expressed by $\Delta f = kv$, where $\Delta f$ is the amount of doppler shift, k is a propagation constant and v is a velocity of a target. In the FIG. 1 system, the doppler shift can be expressed as follows $\Delta f = \omega dT/dt = (\omega/v)dL/dt$, where $\omega$ is the frequency of the i.f. signal in radians.

As shown in FIG. 1, the optical beam 55 is deflected by a deflector 60. However, the deflector 60 could actually move the laser diode 50, rather than simply moving the optical beam 55. This could be implemented with a simple tilt mechanism. To minimize the number of moving parts, the deflector 60 can be an acoust optical device. Acoust optical deflectors can be purchased commercially, such as the acoust optic deflector model AOD-150 manufactured by IntraAction Corp., 3719 Warren Avenue, Bellwood, Ill.

The delayed signal provided by output terminal 25 is amplified by an amplifier 70 and translated back to the frequency of the received r.f. signal by a local oscillator 75. The delayed signal is then retransmitted by antenna 80. The retransmitted signal is stronger than the real radar reflection, and therefore, is locked onto by the originating radar. As the light beam 30 is moved in the direction A, the retransmitted or false return signal causes the originating radar to indicate that the target's location and velocity are different than they actually are. More particularly, the range (delay) and the doppler shift (frequency) are modified so that the originating radar can no longer track the target.

Referring to FIG. 1, it is possible to have two independently movable light beams such as 30 and 175. The ability to have two independently controllable light beams allows the delay provided by a ACT device to be extended. For example, referring to FIG. 1, when an initial signal is received and generates a light beam at a point 21, the position control signal gradually sweeps the light beam in the direction of arrow A. When the light beam reaches the position indicated by 22 in FIG. 1, a switch 180 is moved from the position B to the position C. The second light beam is switched on at the point 21 so that two lights spots are generated at the positions 21 and 22. The unfriendly or victim radar range gate is still locked on the delayed signal corresponding to the spot at location 22. The switch 185 is then switched from the position B to the position C. The spot at position 21 is then within the range gate of the unfriendly or victim radar. The spot at location 22 is ignored by the victum radar. The spot at location 22 can then be moved in the direction of A to further increase the range delay to a maximum twice the delay of the ACT device 10. When the spot reaches the location 22, the process can be repeated and another (not shown) fixed delay can be switched in if desired. Thus, the return signal generated by the light beam 175 is delayed by a fixed delay provided by fixed delay 185. The amount of delay provided by the fixed delay 185 corresponds to the total amount of delay provided by the ACT device 10. Thus, to the originating radar, the signal 175 appears to be delayed by the same amount of time that the original delayed signal 30 was delayed by. By moving the light beam 175 in the direction of A, the amount of delay is thus doubled.

FIG. 2 schematically illustrates the optics of the FIG. 1 system. The laser diode 50 emits a fan-shaped beam. A spherical lens 95 and cylindrical lens 100 astigmatically focus the light beam into a ribbon of light which is applied to the deflector 60. In a preferred embodiment, the laser diode 50 emits light having a wavelength of 820 nm and a power of approximately 30 mW. The spherical mirror 95 has a focal length of 25 mm and a 12 mm diameter, while the cylindrical lens 100 has a 25 mm focal length.

A quarter-wave plate 105 provides circularly-polarized light to the deflector 60. The deflector 60 includes a $TeO_2$ Bragg cell; and therefore requires circularly-polarized light. The remainder of the optical path shown in FIG. 2 is insensitive to polarization. In one embodiment of the present invention, the deflector 60 has a center frequency of approximately 60 MHz with a 40 MHz bandwidth. Because optical acoustic charge transport devices require only a small amount of optical input power, the deflector 60 can be driven with modest RF power, such as 100 mW of RF drive power.

In order to achieve a small spot size, the light exiting the deflector 60 passes through a cylindrical lens 110 and a spherical lens 115. In an embodiment of the present invention, the cylindrical lens 110 has a 25 mm focal length, and the spherical lens 115 has a 180 mm focal length. Mirrors 120 and 125 redirect the beam in order to minimize the space occupied by the optical system. The resulting spot illuminates a point on the light sensitive channel plate of an ACT. In an embodiment of the present invention, the spot can be deflected over 9 mm and has a size of approximately 20 $\mu$m. The deflector 60 can provide, for example, 450 resolvable spots. To achieve a 3 $\mu$sec delay, a 9 mm light sensitive channel plate is needed. As a result, the spot should be no larger than 20 $\mu$m. Larger delays can be accommodated by using a longer focal-length lens in the position of lens 115, although the spot size will increase proportionally. For example, to obtain a 10 $\mu$sec delay, a 600 mm focal length lens could be used as the lens 115, which would produce a 60$\mu$m spot diameter.

FIG. 3 schematically illustrates an example of a circuit for providing the position control signal in the FIG. 1 system. In FIG. 3, digital position control inputs 130 are applied to a D/A converter 135. The output of the D/A converter 135 is applied to a DC amplifier 140. A voltage controlled oscillator (VCO) provides the needed frequency range to drive the deflector 60. The output of a crystal oscillator 150 is mixed in a mixer 155 with the output of the VCO 145. A low pass filter 160 selects the difference frequency provided by the mixer 155. The output of the low pass 160 is amplified by a RF amplifier 165 to provide the control signal for the deflector 60.

In general, the change in deflection angle of a light beam (in radians) to a change $\Delta f$ of the RF position control signal is $$\Delta\theta = [\lambda/nv]\Delta f \qquad (1)$$

where:
$\lambda$ = optical wavelength in air
n = index of refraction of Bragg cell material
f = Bragg cell RF drive frequency
v = sound velocity in Bragg cell
$\theta$ = deflection The deflection angle determines the deflection position of the optical spot on the light sensitive channel plate 20, and the position of the optical spot is given by $$\Delta X = \approx F \Delta \theta \quad (2)$$

where: F=focal length of lens 115.

From the above, it is seen that the output of the VCO 145 can smoothly vary the RF position control signal as applied to the deflector 60. As a result, the range delay provided by the system is smoothly varied. To achieve the desired smoothness in the range delay variations, a high precision D/A converter 135 can be employed, for example, 12 bits. The system of the present invention can use a high precision D/A converter because the speed of the response of the system does not need to be very great. For example, the range sweep can occur over a period of 5-10 seconds. Thus, the speed of a D/A converter is not critical to the present invention.

II. Realistic False Target Generation

FIG. 4 is a second embodiment of the present invention. The object of the second embodiment is to allow the present invention to realize a desired impulse response h(t) which simulates the impulse response of a real radar return such as shown in FIG. 5B. The radar return shown in FIG. 5B represents an approximation of a return from a target shown in FIG. 5A illuminated with a radar beam 82. FIG. 4, illustrates one approach to realizing this object. In FIG. 4 an amplitude shaping aperture 85 is positioned between the deflector 60 and the lens 65. To do this, the amplitude shaping aperture 85 smears the light beam 30 to approximate a reflection from an actual target as well as ground bounce and other radar propagation phenomenon.

The amplitude shaping aperture 85 generates an intensity distribution I(x) of light on the light sensitive channel plate 20. This distribution I(x), is directly related to the desired impulse response The position x on the light sensitive channel plate 20 is related to the time t that the injected pulse takes to reach the output, and the acoustic velocity in the device by the following $$t = x/v_{sound}$$

Using this, the desired impulse response is expressed as $$h(t) = I(x/v_{sound})$$

Since the light sensitive channel plate 20 is in the focal plane of the lens 65, in order to achieve the distribution I(x), the amplitude shaping aperture 85 has an optical transmission that varies across its aperture and described by the function A(x'), where x' is the coordinate in the plane of the amplitude shaping aperture, and the function A is a scaled version of the function I(x) in accordance with the geometry 65.

The approximation of a radar reflection from an actual target can also be achieved by replacing the amplitude shaping aperture 85 with a circuit to appropriately vary the microwave position control signal shown in FIG. 4. In accordance with the present invention, the position of a laser beam, such as the light beam 30, on an optical acoustic charge transport device 10 is controlled by the acousto-optic deflector 60. The spatial behavior of the light beam 30 (e.g., spot size and position) are a function of the microwave position control signal applied to the deflector 60. For a narrow band signal, the spot will generally have a Gaussian spatial intensity pattern. The diameter of the spot will be a function of the aperture of the deflector 60 and the focusing of the lens 65. By inputting a broadband microwave position control signal to the deflector 60, the spot size may be enlarged and its spatial intensity profile varied. It is important, however to ensure that the generated false return signal provided by antenna 80 is a constant energy signal.

Figure 5A:
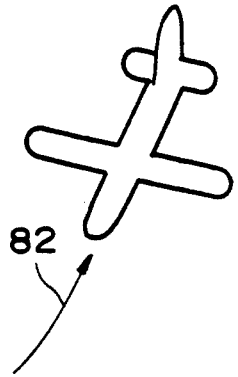
FIGS. 5A and 5B illustrate an illuminated target and an illustrative radar return from the target.
Figure 5B:
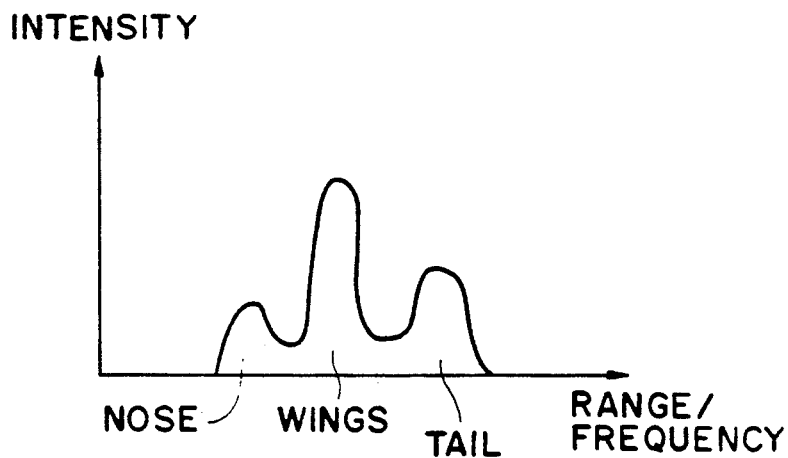

As shown in FIG. 5A, a real target has radar-reflecting surfaces at different ranges from an illuminating radar. A typical 30MHz radar has approximately a three foot resolution. Thus, a return such as shown in FIG. 5B would be generated by conventional aircraft. One way of generating different returns at different ranges, such as shown in FIG. 5B, is inputting a microwave position control signal to the deflector 60 that includes multiple frequencies. This would generate multiple spots at different positions on the light sensitive channel plate 20 shown in FIG. 4. If two such spots do not overlap, then there is no interaction between the spots on the light sensitive channel plate 20; and thus no interaction in the two false radar returns. If, however, two of the spots overlap on the light sensitive channel plate 20, then a beat signal will be generated that may interfere with generating a realistic false radar return signal. This is because no frequency shift and therefore no beat signal is present in a real radar return signal. In addition, it is important to ensure that a constant energy position control signal be generated Referring to FIG. 4, if the laser diode 50 is modulated with a signal corresponding to $(A = A_1 COS \omega_{IF} t)$, the optical intensity of the light provided by the laser diode 50 will be $(P = P_1 COS \omega_{IF} t)$, where $w_{IF}$ represents the intermediate frequency of the signal modulating the laser diode 50. The optical amplitude therefore becomes $(P_1 COS \omega_{IF} t)^{\frac{1}{2}} COS(\omega t)$, where $\omega$ is the optical frequency. Due to the frequency shifting properties of the deflector 60, the optical amplitude of the light beam 30 will satisfy the following $$A_0 = (P_1 COS \ \omega_{IF} t)^{\frac{1}{2}} COS(\omega + \omega_1) t$$

where $\omega_1$ is the frequency required by the deflector 60 to deflect light to the desired location on the light sensitive channel plate 20. If the desired spots to not overlap, carriers will be generated in the light sensitive channel plate 20 at two separate locations. The number of carriers is proportion to the optical intensity in accordance with the following $$P_0 = A_0^2 = P_1 COS \omega_{IF} t [COS^2(\omega + \omega_1)t].$$

The $COS^2$ term contains a DC component and a component at twice the frequency that carriers can be generated in the light sensitive channel plate 20. Thus, practically speaking, the carriers generated in the light sensitive channel plate 20 are proportional to $P_1 COS \omega_{IF} t$.

If, however, two spots generated on the light sensitive channel plate 20 overlap the optical amplitude at the overlap satisfies the following $$A_0 = (P_1 COS \omega_{IF} t)^{\frac{1}{2}} [COS(\omega + \omega_1)t + COS(w + \omega_2) \ t]$$

and the optical intensity corresponds to $$P_0 = A_0^2 = (P_1 COS \omega_{IF} t)[COS(\omega + \omega_1)t + COS(\omega + \omega_2)t]^2.$$

Because the cross-product term [COS $(\omega + \omega_1)t +$ COS $(\omega + \omega_2)t$ has sum and difference frequency terms, the output of the optical acoustic charge transport device 10 will, in effect, be proportional to $(P_1 COS \omega_{IF} t)(D + COS (\omega_1 - \omega_2)t)$, where D corresponds to the sum of DC terms of the equation for $P_0$. Thus, without appropriate care, the generated signal will be undesirably amplitude modulated at a beat frequency corresponding to $\omega_1 - \omega_2$. Thus, overlapping spots created by multiple frequencies in the microwave position control signal applied to the deflector 60 should be avoided.

One way of generating the appropriate radio frequency (RF) position control signal to avoid this problem is described below. If, for example, a false radar return signal such as that shown in FIG. 5B is desired, then this return is used as a basis for designing an appropriate RF position control signal to be applied to the deflector 60. The range illustrated in FIG. 5B is directly related to the time delay which must be experienced by carriers generated by the light beam 30 in the optical ACT device. Thus, the range shown in FIG. 5B is directly related to a frequency component of the RF position control signal applied to deflector 60. If this signal contains a multiplicity of frequency components, then a multiplicity of optical beams perhaps overlapping, f will be directed to the light sensitive channel plate 20. The optical intensity of each beam is directly proportional to the electrical intensity or power of the corresponding frequency component of the RF position control signal.

The optical intensity distribution thus created on the channel plate 20 is directly proportional to the impulse response of the false radar return. The shape of this impulse response h(t) is, in turn, the same as the shape of the power spectrum $X_p(\omega)$ of the RF position control signal x(t), because it does not specify phase. Depending on the relative phases of the various frequency components, x(t) may have an amplitude which is relatively constant in time for one set of phases, or highly pulse-like for different set. An x(t) whose amplitude is relatively constant is needed to create realistic false radar return.

One straight forward way to design an RF position control signal x(t) is to form an amplitude spectrum $X_a(\omega)$ whose magnitude is the square root of the desired power spectrum $X_p(\omega)$ and whose phase $\phi(\omega)$ is a random, noise-like function of frequency:

$$X_a(\omega) = |X_p(\omega)|^{\frac{1}{2}} e^{-j\phi(\omega)}$$

The inverse Fourier transform of this spectrum will be a control signal x(t) with the desired properties: a relatively constant amplitude signal having the required power spectrum.

The results of this computation could be stored in a Read Only Memory (ROM) in the form of a sequence of samples $\{x_n\}$. The number of frequency samples depends on the target size and the radar resolution. A typical 30 MHz radar has approximately a three foot resolution. Thus, 64 samples would provide 192 feet of target size, the number of samples can be varied in accordance with the desired size of the false target. During operation, these numerical samples could be sequentially D/A converted to provide an analog RF control signal suitable for input to defector 60.

Figure 6:
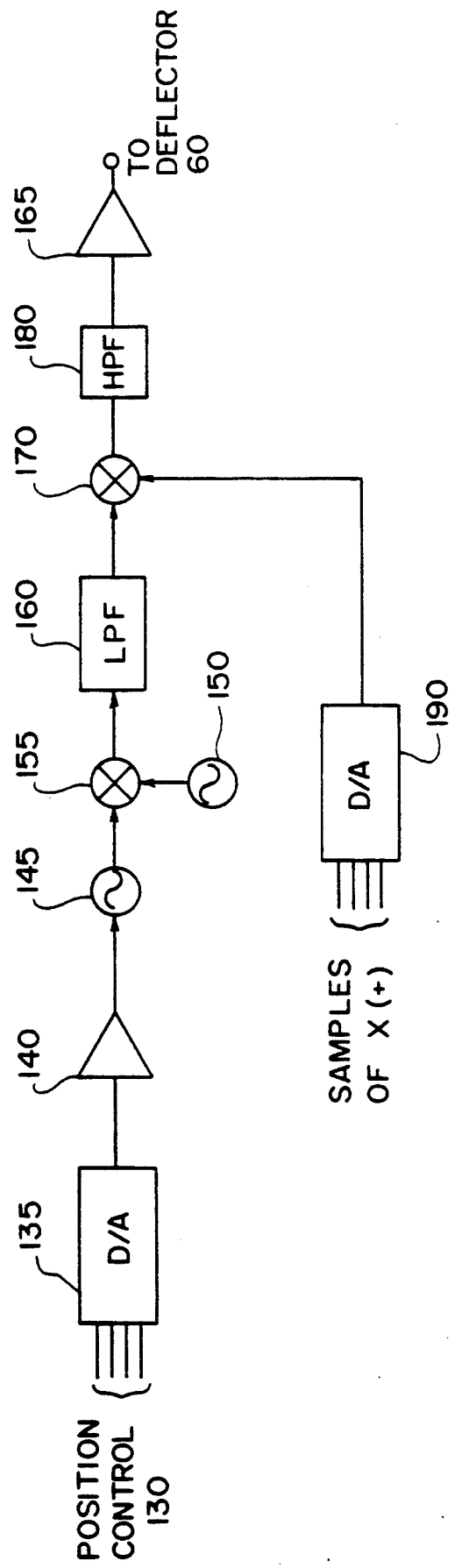
FIG. 6 is a variation of the FIG. 3 circuit.

By mixing this signal x(t) with the output of a VCO, as exemplified by replacing the fixed oscillator 150 FIG. 3 by the signal x(t), a realistic false radar return which is movable can be realized. FIG. 6 shows a preferred embodiment of this scheme. Samples of x(t) are converted to an analog signal by D/A converter 190, producing analog signal x(t) having the correct power spectrum to make a realistic radar return impulse response h(t). Digital position control signal 130 is converted to an analog signal by D/A converter 135. After suitable scaling by DC amplifier 140, this analog signal forms the control signal of VCO 145. Fixed oscillator 150, mixer 155, and low pass filter 160 are used to offset the variable frequency RF to a lower frequency range, to provide a capability of sweeping over a large fractional bandwidth. The output of LPF 160 is mixed with analog signal x(t) in mixer 170, filtered by 180, and amplified by 165 to provide 165 to provide the RF input signal for deflector 60.

III. Multiple False Targets

Figure 7:
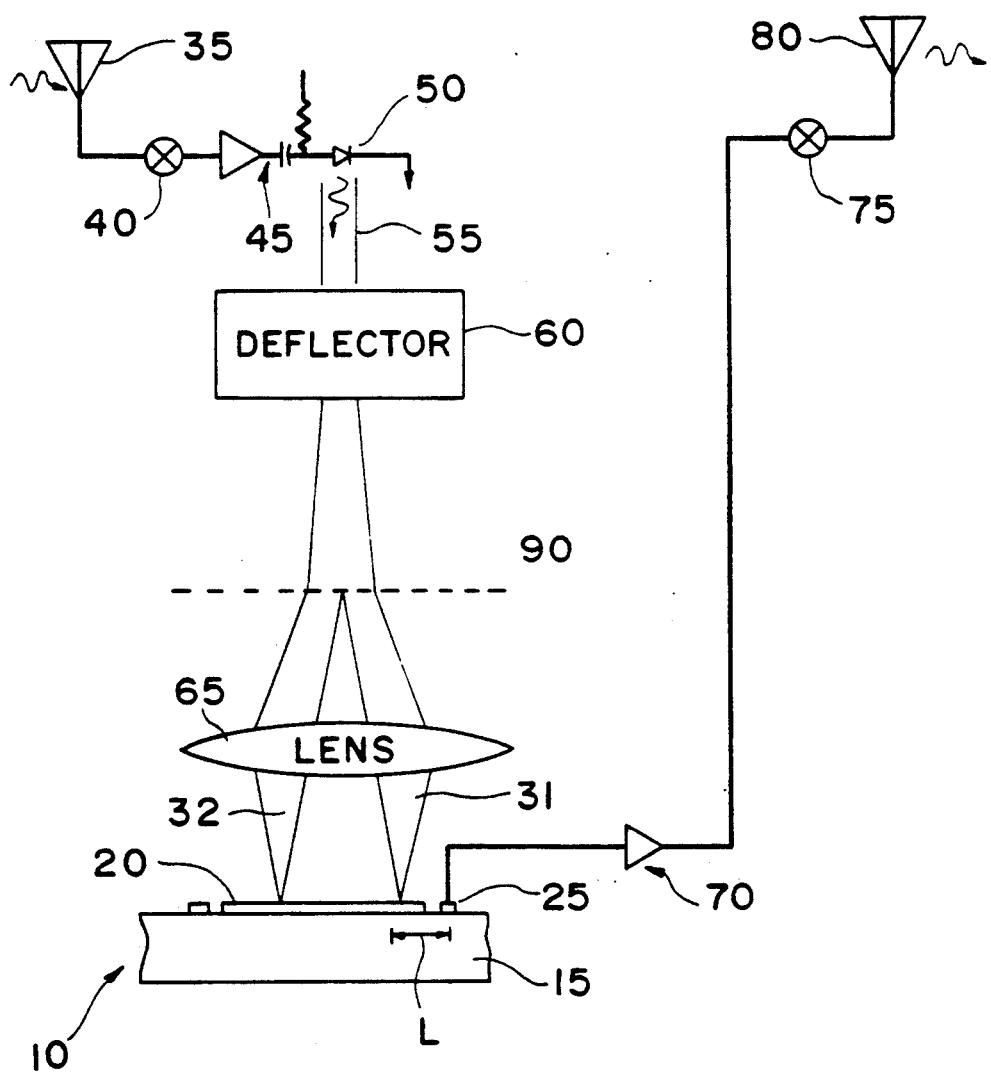
FIG. 7 is a third embodiment of the present invention.

FIG. 7 is a third embodiment of the present invention. FIG. 7 adds a diffraction grating 90 between the deflector 60 and the lens 65. This has the effect of optically generating a number of false return signals by generating multiple light beams exemplified by beams 31 and 32. This is similar to electrically generating multiple beams as noted above. Each of the beams 31 and 32 inject a signal in the ACT device 10. The various signals experience different delays, and automatically are imparted with a doppler shift as discussed above. If the diffraction grating 90 has a uniform pitch, then the multiple light beams 31 and 32 move in synchronism across the channel plate 20. If, however, the diffraction grating 90 has a nonuniform pitch, then the multiple light beams 31 and 32 can be made to move in a fashion. In this case, the diffraction grating 90 is moved transversely to this axis of the light received by the diffraction grating 90. This produces false return signals which simulate relative motion among targets. Each of the false return signals automatically includes a doppler shift. Since the multiple light beams 31 and 32 do not move in synchronism, they can have different doppler shifts. This simulates movement of multiple realistic targets.

It is also possible to combine the amplitude shaping aperture 85 and diffraction grating 90 to simulate multiple targets which have smeared or realistic returns.

The foregoing is considered as illustrative of the principles of the invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

We claim:
1. A false return signal apparatus, comprising:
   receiver means for receiving radar signals and for generating light responsive to the received radar signals;
   deflector means for variably deflecting the light across a predetermined area; and
   an acoustic charge transport device positioned in the predetermined area and having an output connected to provide a false return signal responsive to the light received from the deflector means.
2. A false return signal apparatus according to claim 1, further characterized as including:
   control means, operatively connected to the deflector means, for controlling the deflector means to deflect the light across the predetermined area.
3. A false return signal apparatus according to claim 2, wherein the deflector means includes a lens posi- tioned to focus the light into at least one light spot within the predetermined area.

4. A false return signal apparatus according to claim 3, further characterized as including:
   an amplitude shaping aperture positioned to impart a desired light intensity within the predetermined area.

5. A false return signal apparatus according to claim 3, further characterized as including:
   a diffraction grating positioned to deffract the light so that the lens focuses the light into at least two light spots within the predetermined area.

6. A false return signal apparatus according to claim 3, wherein the control means includes:
   means for controlling the deflector means to deflect the light across the predetermined area has at least two light spots.

7. A false return signal apparatus according to claim 2, wherein the control means includes means for electrically controlling the deflector means to deflect the light in a manner to provide a desired light intensity within the predetermined.

8. A false return signal apparatus, further characterized as comprising:
   receiver means for receiving radar signals and for generating light responsive to the received radar signals;
   a Bragg cell positioned to receive the light and to deflect the light into at least one light beam across a predetermined area; a lens positioned to receive light from the Bragg cell and to focus the received light into at least one light spot within the predetermined area; and
   an optical acoustic charge transport device having a light sensitive channel plate positioned in the predetermined area and having an output connected to provide a false return signal responsive to light received from the lens.

* * * * *